US009280656B2

(12) United States Patent
Kwon et al.

(10) Patent No.: US 9,280,656 B2
(45) Date of Patent: Mar. 8, 2016

(54) DEVICE AND METHOD FOR PROVIDING SECURITY CHANNEL INTERFACE

(71) Applicants: University-Industry Foundation, Yonsei University, Seoul (KR); Industry-Academia Cooperation Group of Sejong University, Seoul (KR)

(72) Inventors: Taekyoung Kwon, Seoul (KR); Sarang Na, Seoul (KR)

(73) Assignees: UNIVERSITY-INDUSTRY FOUNDATION, YONSEI UNIVERSITY, Seoul (KR); INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 25 days.

(21) Appl. No.: 14/082,590

(22) Filed: Nov. 18, 2013

(65) Prior Publication Data

US 2014/0157400 A1   Jun. 5, 2014

(30) Foreign Application Priority Data

Nov. 16, 2012   (KR) .......................... 10-2012-0130415
Dec. 12, 2012   (KR) .......................... 10-2012-0144753

(51) Int. Cl.
*G06F 21/00* (2013.01)
*G06F 21/45* (2013.01)
*G06F 21/31* (2013.01)
*G06F 21/83* (2013.01)
*G06F 21/84* (2013.01)

(52) U.S. Cl.
CPC ................ *G06F 21/45* (2013.01); *G06F 21/31* (2013.01); *G06F 21/83* (2013.01); *G06F 21/84* (2013.01)

(58) Field of Classification Search
CPC ......... G06F 21/45; G06F 21/84; G06F 21/31; G06F 21/83
USPC .............................. 726/16, 17, 18, 19, 20, 21
See application file for complete search history.

(56) References Cited

U.S. PATENT DOCUMENTS

| 7,030,890 | B1 * | 4/2006 | Jouet | G06F 9/4443 345/589 |
| 7,602,947 | B1 * | 10/2009 | Lemelson | B60Q 1/0023 340/426.1 |
| 7,779,462 | B2 * | 8/2010 | Mathew | G06F 1/1601 713/164 |
| 7,986,816 | B1 * | 7/2011 | Hoanca | G06K 9/00597 382/115 |
| 7,992,007 | B2 * | 8/2011 | Lazzaro | G06Q 30/0641 713/183 |
| 8,358,321 | B1 * | 1/2013 | Weidner | G09G 5/00 345/619 |
| 8,464,337 | B2 * | 6/2013 | Mathew | G06F 1/1601 713/166 |

(Continued)

FOREIGN PATENT DOCUMENTS

KR   10-2008-0073121 A   8/2008
KR   10-2010-0105555 A   9/2010

(Continued)

*Primary Examiner* — David Garcia Cervetti
(74) *Attorney, Agent, or Firm* — Pearne & Gordon LLP

(57) ABSTRACT

A security channel interface providing device is provided. The device includes a sensor unit that comprises at least two sensors configured to sense a motion of a user, and a control unit that determines whether or not at least two sensing values sensed by the sensors satisfy a security channel interface activation condition, and activates or inactivates a security channel interface according to a result of the determination. When the security channel interface is activated, the control unit provides a security channel to the user.

19 Claims, 16 Drawing Sheets

(56) References Cited

U.S. PATENT DOCUMENTS

| | | | | |
|---|---|---|---|---|
| 8,832,807 B1* | 9/2014 | Kuo | ........................ | G06F 21/45 713/183 |
| 2004/0113819 A1* | 6/2004 | Gauthey | ................. | G06F 21/83 341/34 |
| 2006/0230267 A1* | 10/2006 | Mathew | ................ | G06F 1/1601 713/168 |
| 2010/0259560 A1* | 10/2010 | Jakobson | ................ | G06F 21/62 345/629 |
| 2011/0172953 A1* | 7/2011 | Kim | ................... | H05B 37/0227 702/150 |
| 2012/0023422 A1* | 1/2012 | Biton | ............... | G06K 19/07703 715/764 |
| 2012/0124651 A1* | 5/2012 | Ganesan | ................ | G06F 21/31 726/4 |
| 2012/0192255 A1* | 7/2012 | Ganesan | ................ | H04L 9/3215 726/6 |
| 2012/0268598 A1* | 10/2012 | Holmes | ................. | B42D 25/29 348/143 |
| 2013/0015946 A1* | 1/2013 | Lau | .......................... | G07C 9/00 340/5.2 |
| 2013/0179965 A1* | 7/2013 | Li | ........................... | G06F 21/45 726/18 |
| 2013/0244613 A1* | 9/2013 | Whitmyer, Jr. | ... | H04M 1/72577 455/411 |
| 2013/0260718 A1* | 10/2013 | Miyaki | ................. | H04W 12/08 455/411 |
| 2013/0260720 A1* | 10/2013 | Miyaki | ................. | H04W 12/08 455/411 |
| 2013/0263215 A1* | 10/2013 | Ekdahl | .................... | G06F 21/84 726/2 |
| 2013/0291095 A1* | 10/2013 | Cheng | .................... | G06F 21/36 726/19 |
| 2014/0338004 A1* | 11/2014 | Camiel | .................. | G06F 21/62 726/30 |

FOREIGN PATENT DOCUMENTS

| | | |
|---|---|---|
| KR | 10-2011-0098729 A | 9/2011 |
| WO | 2009/067224 A1 | 5/2009 |
| WO | 2010/077430 A1 | 7/2010 |

\* cited by examiner (a)        (b)

DEVICE AND METHOD FOR PROVIDING SECURITY CHANNEL INTERFACE

This application claims the benefit of Korean Patent Application No. 10-2012-0130415 filed on Nov. 16, 2012 and Korean Patent Application No. 10-2012-0144753 filed on Dec. 12, 2012, the entire disclosures of which are incorporated herein by reference.

FIELD OF THE INVENTION

The present disclosure relates to a device and a method for providing a security channel interface to enter a password to a mobile device.

BACKGROUND OF THE INVENTION

In recent years, as smart devices such as smartphones, tablet computers, and computers and tasks requiring security features such as mobile banking and Internet banking by using such smart devices have become widely used, users are increasingly required to confirm or input their passwords when they are in a public space. Personal information such as the user's password can be easily exposed to other people or cameras because they are displayed on the front surface of the smart device without being protected by any physically implemented blocking screen or the like. Hence, many techniques concerning security in inputting a password have been proposed, yet there still isn't a technology satisfying both security and convenience in inputting and confirming a password.

Therefore, development of a physical security channel that enables a user to securely confirm or input a password is still demanded.

FIG. 1 is a diagram illustrating a configuration of a general channel and a security channel according to prior art.

In accordance with an embodiment of the prior art smart device, a security channel is a channel separate from a general channel. The general channel is activated in a normal state, and when a user calls the security channel, the security channel is activated and a password is displayed on the whole screen of the smart device.

By way of example, although a physical one-time password (OTP) device needs to output a password only to its user to be visually checked, the password is always exposed on a screen. Likewise, while a user checks a password or confidential information through a screen of a smart device, the password or confidential information is displayed on the whole screen. As such, in the case of using a separate security channel to display a password, the password is always exposed or has a wide exposure range on the screen, and, thus, it can be easily leaked to attackers (others than the user, cameras, and the like) near the user.

Therefore, to solve such a problem, there is a need for a security channel interface that enables a user to take natural physical actions and provides the security channel which is not exposed to external media other than the user.

In this regard, Korean Patent Laid-open Publication No. 2008-0073121 (entitled "Finance automating device and display method for preventing its secret number from being leaked") suggests a finance automating device, and a secret number input device and method for activating a secret number input menu window by touch recognition of a user through a screen display unit and setting a size, a position, and a transparency degree of a secret number input window as desired by the user during an active state.

BRIEF SUMMARY OF THE INVENTION

In view of the foregoing, some illustrative embodiments of the present disclosure provide a device and a method for providing a security channel interface that, by using two or more sensors, induced a user to take a natural physical action and activates a security channel which can be seen by only the user.

In accordance with a first aspect of the illustrative embodiments, a security channel interface providing device is provided. The device includes a sensor unit that comprises at least two sensors configured to sense a motion of a user, and a control unit that determines whether or not at least two sensing values sensed by the sensors satisfy a security channel interface activation condition, and activates or inactivates a security channel interface according to a result of the determination. When the security channel interface is activated, the control unit provides a security channel to the user.

Further, in accordance with a second aspect of the illustrative embodiments, a security channel interface providing method using a security channel interface providing device is provided. The method includes steps such as, from at least two sensors provided in a security channel interface, receiving sensing values of a motion of a user generated when a guide for inducing a motion of the user is provided, determining whether or not the at least two sensing values sensed by the sensors satisfy a security channel interface activation condition, activating or inactivating the security channel interface according to a result of the determination, and providing a security channel to the user when the security channel interface is activated.

In accordance with any one of the illustrative embodiments, a user's physical action is detected and a security channel is activated. Based on a degree of the user's physical action, a security degree can be adjusted heuristically. That is, while a password or other personal information such as a one-time password (OTP) which should be exposed only to the user is being confirmed or entered, a security channel which is not exposed to others can be activated.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
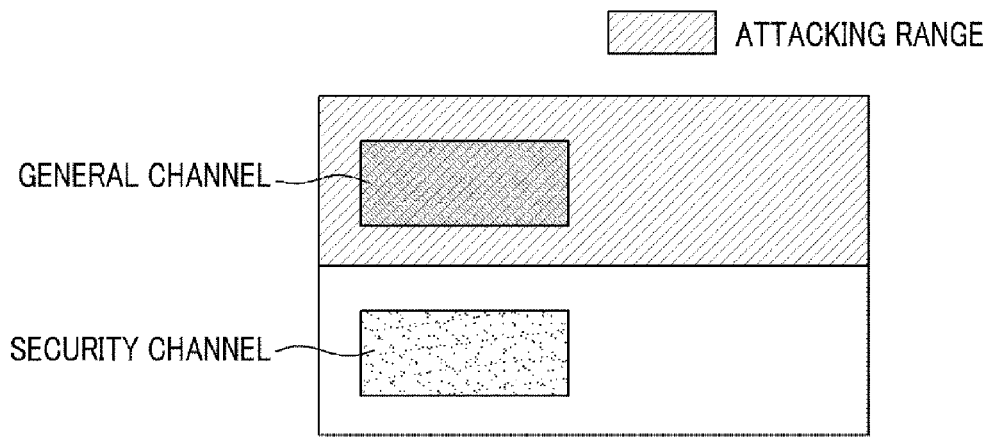
FIG. 1 is a diagram illustrating a configuration of a general channel and a security channel according to prior art.

Hereinafter, illustrative embodiments of the present disclosure will be described in detail with reference to the accompanying drawings so that the present disclosure may be readily implemented by those skilled in the art. However, it is to be noted that the present disclosure is not limited to the illustrative embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Prior to illustrative embodiments of the present disclosure, a configuration of a security channel and a general channel will be explained.

Figure 2:
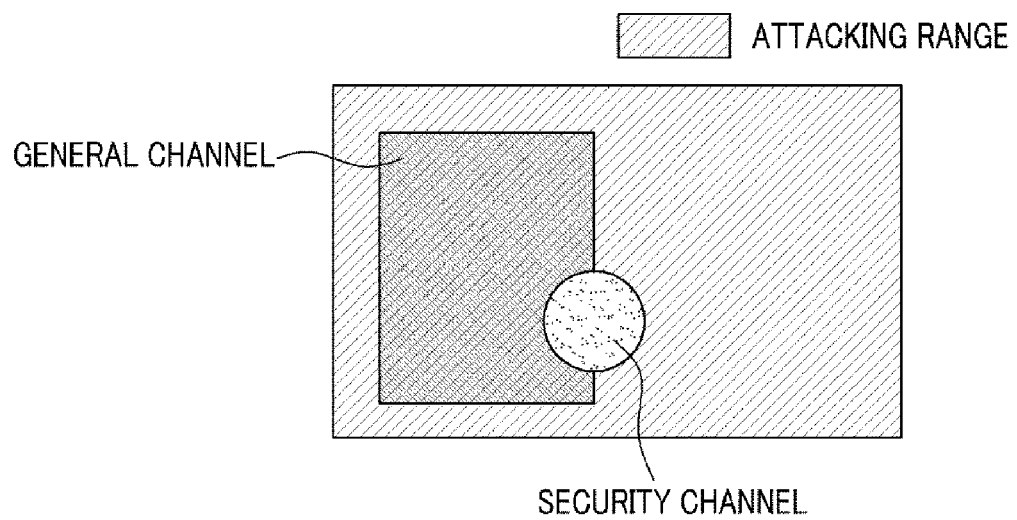
FIG. 2 is a diagram illustrating a configuration of a general channel and a security channel in accordance with an illustrative embodiment of the present inventive concept.

FIG. 2 is a diagram illustrating a configuration of a general channel and a security channel in accordance with an illustrative embodiment of the present inventive concept.

As depicted in FIG. 2, a security channel is included as part of a general channel, which is different from prior art as shown in FIG. 1. The security channel is inactivated in a normal state, and when a security channel interface is activated, the security channel is exposed at a specific area combined with the general channel. The general channel is an open channel positioned at a front surface of a screen of a device. Since the screen of the device is easily exposed to attackers, it lacks security but has merits of immediacy and convenience and thus offers a high usability to the user.

As depicted in FIG. 2, the security channel of a security channel interface providing device in accordance with an illustrative embodiment of the present disclosure is exposed at a specific area combined with the general channel, but with a configuration that enables a user to take a physical action to form a blocking screen, the security channel can be activated securely.

Hereinafter, the illustrative embodiments of the present disclosure will be explained in detail with reference to the accompanying drawings.

Figure 3:
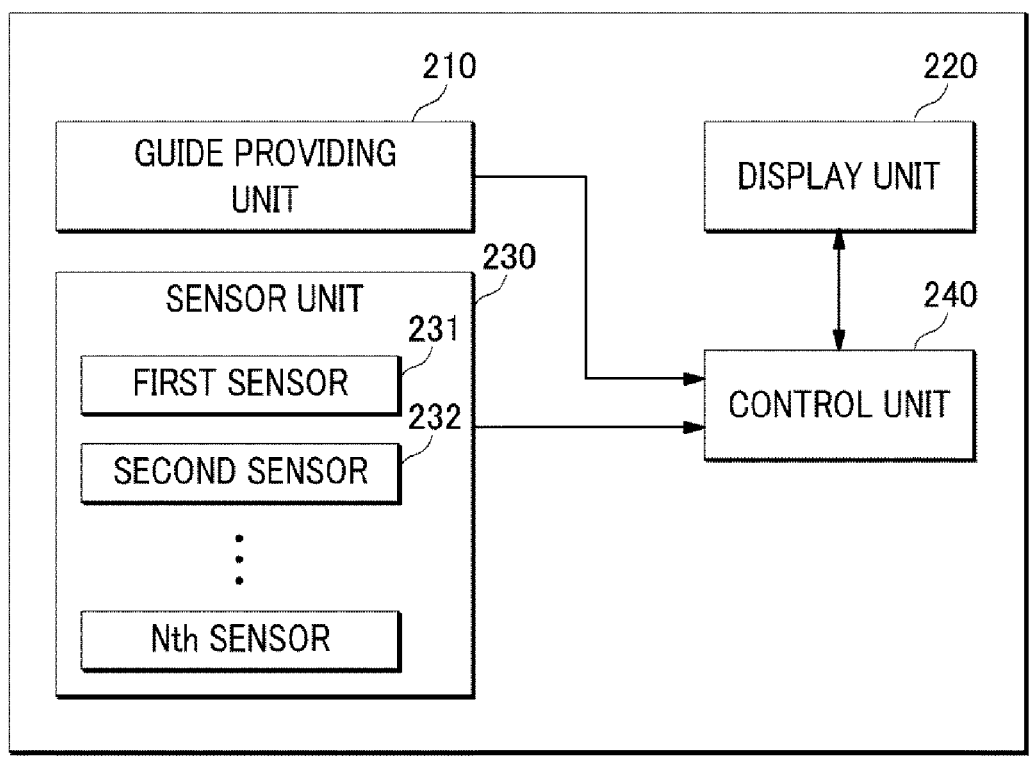
FIG. 3 is a block diagram illustrating a configuration of a physical security channel interface providing device using two or more sensors in accordance with an illustrative embodiment of the present inventive concept.

FIG. 3 is a block diagram illustrating a configuration of a physical security channel interface providing device using two or more sensors in accordance with an illustrative embodiment of the present inventive concept.

A mobile communication device (for example, a smart phone) will be explained as a security channel interface providing device 200 in accordance with the illustrative embodiment.

FIG. 3 illustrates components for proving a security channel interface using two or more sensors in accordance with an illustrative embodiment of the present inventive concept. However, other processing units (not illustrated) may be further included therein depending on the device type.

Further, the security channel interface providing device 200 in accordance with the illustrative embodiment is not limited to the mobile communication device but may include various kinds of devices and may comprise different processing units depending on the type and the purposes of the device. By way of example, if the security channel interface providing device 200 is an ATM used in a bank, various processing units such as a communication module that is connected to a bank computing system, a computing unit that performs a banking service for each banking account, and a user interface module that enables a user to use a banking service by inputting information or outputting a result of the banking service.

As depicted in FIG. 3, the security channel interface providing device 200 in accordance with the illustrative embodiment may include a guide providing unit 210, a display unit 220, a sensor unit 230, and a control unit 240.

In order for the security channel interface providing device 200 to receive a sensing value detected in response to a motion of a user, the guide providing unit 210 provides a guide. That is, the guide providing unit 210 provides a guide for inducing and guiding the user to enter a sensing value that meets certain conditions. The guide is output onto the display unit 220 by the control unit 240.

Herein, the guide may vary depending on a configuration of the sensor, and an example of proving the guide will be explained below with reference to FIG. 4.

The sensor unit 230 receives the sensing value recognized in response to a motion of the user. The sensor unit 230 is comprised of at least two sensors. A first sensor 231, a second sensor 232, and an nth sensor may be configured using a sensor such as a touch sensor, a direction sensor, a proximity sensor, a gravity sensor, and the like depending on the device's type or application.

A configuration example of the sensor unit 230 comprising the first sensor 231 and the second sensor 232 in the security channel interface providing device 200 will be explained below with reference to FIGS. 5 and 7.

The security channel interface providing device 200 outputs, on the display unit 220, the guide provided by the guide providing unit 210. If the guide output on the display 220 is a straightforward enough for the user to utilize a touch sensor by touching the display unit 220, the user may touch the display unit 220 to input a sensing value.

Further, the display unit 220 displays a security channel interface when the security channel interface is activated. at least one of identifiers (temporary confidential information used for a password) such as a password, a password input interface, numbers, letters, colors, shapes, and the like may be output on the display unit 220.

An example where a guide is provided on the display unit 220 and a sensing value is input by touching the display unit 220 in the security channel interface providing device 200 will be explained below with reference to FIG. 5. Further, an example where the security channel interface activated in the security channel interface providing device 200 is displayed as a password on the display unit 220 will be explained below with reference to FIG. 5, and an example where a shape identifier is displayed will be explained below with reference to FIG. 7. Furthermore, an example where the security channel interface activated in the security channel interface providing device 200 is displayed on the display unit 220 by using a color identifier will be explained below with reference to FIG. 8, and an example where a password input interface combined with a security channel interface is displayed will be explained below with reference to FIG. 9.

The control unit 240 determines whether or not to activate the security channel interface based on a sensing value received by the sensor unit 230. That is, the control unit 240 can activate the security channel interface when a sensing value received by the first sensor 231 and a sensing value received by the second sensor 232 satisfy a preset condition. Meanwhile, the control unit 240 can inactivate the security channel interface when the sensing values do not satisfy the preset condition.

Further, the control unit 240 determines whether or not the sensing values are maintained after the security channel interface is activated. If at least one of sensing values of the first sensor 231, the second sensor 232, and the nth sensor cannot be maintained after the security channel interface is activated, the control unit 240 can inactivate the security channel interface.

Figure 4:
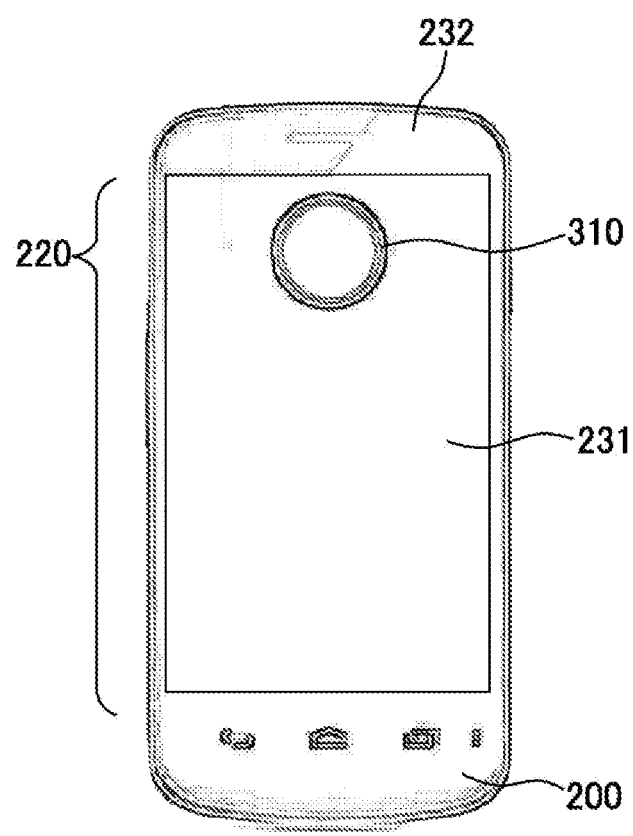
FIG. 4 illustrates a security channel interface device comprising a first sensor and a second sensor in accordance with an illustrative embodiment of the present inventive concept.

FIG. 4 illustrates a security channel interface device comprising a first sensor and a second sensor in accordance with an illustrative embodiment of the present inventive concept.

The security channel interface providing device 200 comprises the first sensor 231 and the second sensor 232, and a guide 310 provided by the guide providing unit 210 is displayed on the display unit 220. A user's motion made along the guide 310 can be recognized by the first sensor 231 and the second sensor 232.

By way of example, as depicted in FIG. 4, the guide 310 may have a circular shape positioned at an upper end of the security channel interface providing device 200. Herein, the guide 310 may be a circular guide 310 having a preset diameter and guides the user to bring the edge of the user's hand into contact with the display unit 220 along the circular guide 310. The guide 310 may have a circular shape in order for the first sensor 231 sensing a touch to induce the user's motion, and the guide 310 is positioned at the upper end of the security channel interface providing device 200 where a proximity sensor may be positioned in order for the second sensor 232 sensing proximity to recognize a sensing value.

Figure 5:
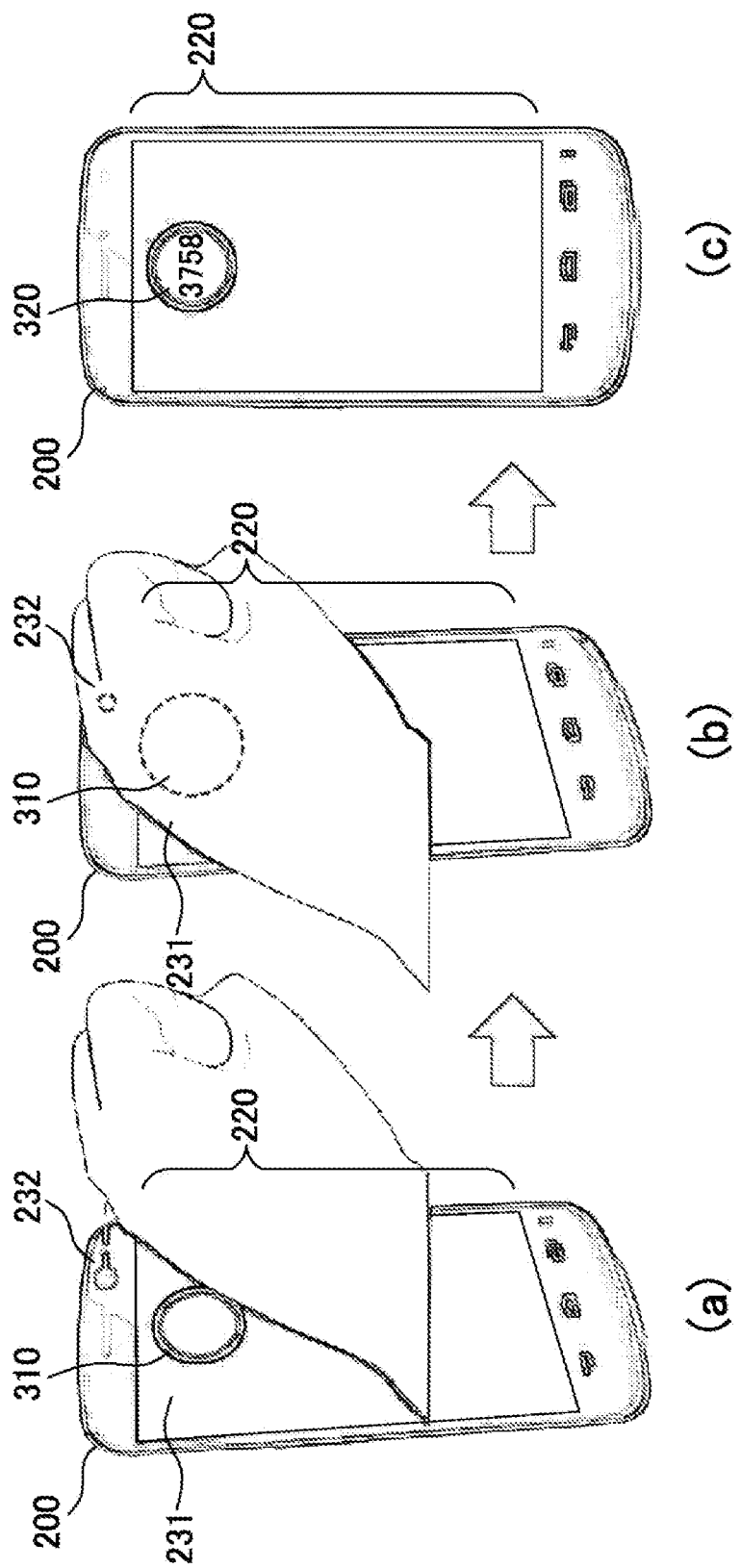
FIG. 5 shows an example for explaining a process for activating a security channel interface by recognition of a first sensor and a second sensor in accordance with an illustrative embodiment of the present inventive concept.

FIG. 5 shows an example for explaining a process for activating a security channel interface by recognition of a first sensor and a second sensor in accordance with an illustrative embodiment of the present inventive concept.

As depicted in FIG. 5A, the circular guide 310 in accordance with an illustrative embodiment of the present inventive concept may be output on the display unit 220, and the user may check out the guide 310 on the display unit 220 and prepare for an input. The security channel interface providing device 200 may comprise the first sensor 231 that recognizes a touch to the circular guide 310 and the second sensor 232 that recognizes proximity to an upper end of the circular guide 310. Then, as depicted in FIG. 5B, when the edge of the user's hand is in contact with the guide 310 on the display unit 220 along the guide 310, the first sensor 231 and the second sensor 232 recognize the user's motion. If sensing values generated at that time satisfy touch recognition conditions of the first sensor 231 and proximity recognition conditions of the second sensor 232, as depicted in FIG. 5C, a security channel interface 320 is activated and displayed on the display unit 220. The user can check a security channel through the activated security channel interface 320 and can reset the security channel interface 320 to an inactive state by disabling recognition of at least one of the first sensor 231 and the second sensor 232. Further, after inactivating the security channel, the user can input a password through a password input interface securely. When the input password is matched with a password of the security channel, security feature can be reset.

Meanwhile, the security channel shown in FIG. 5C is an example of a one-time password (OTP). The one-time password (OTP) is not a fixed password but a user authentication mechanism using an one-time password generated randomly.

Figure 6:
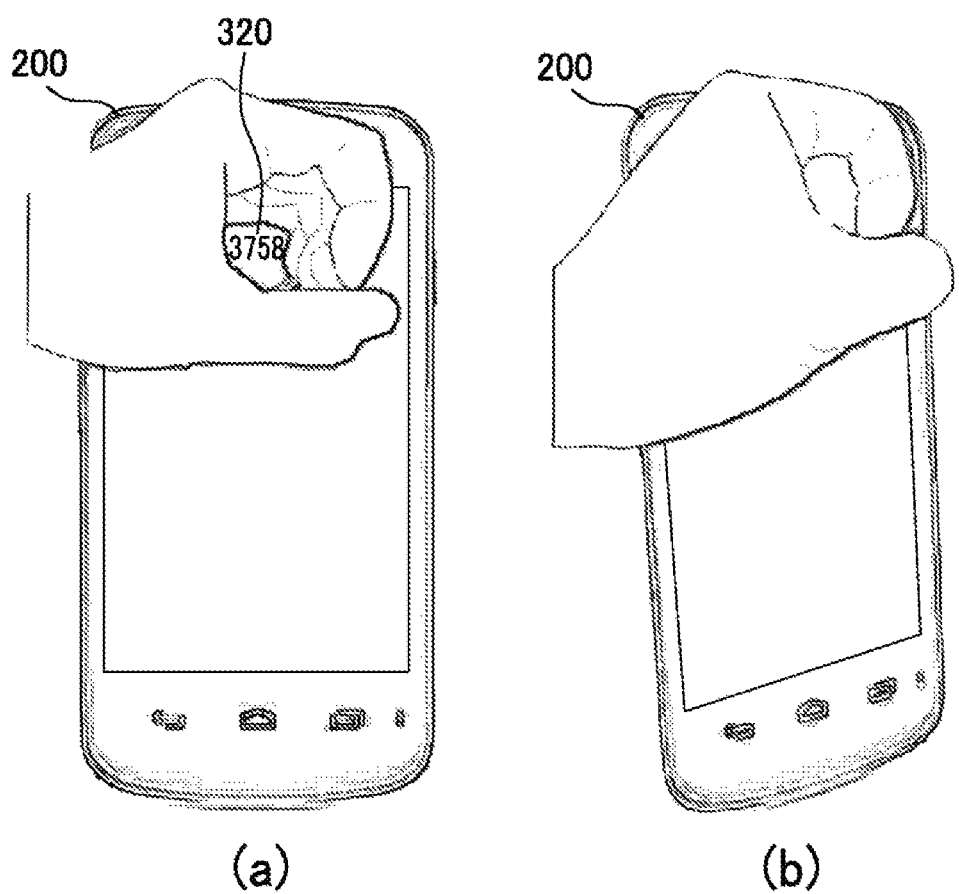
FIG. 6 illustrates a user's view and an attacker's view of a security channel in accordance with an illustrative embodiment of the present inventive concept.

FIG. 6 illustrates a user's view and an attacker's view of a security channel in accordance with an illustrative embodiment of the present inventive concept.

As depicted in FIG. 6A, while the security channel interface 320 is activated, the user's hand forms a blocking screen and a security channel can be checked only by the user from a user-oriented view. the physical range and the maintenance degree covering the security channel may be adjusted depending on the user's body structure and motion type. By way of example, if the user wants to strengthen security, the user may cup the hand narrowly while letting the sensors sense so as to make the view only available to the user. However, if the security channel interface 320 is activated while physical security is weakened and the user's hand does not provide a suitable blocking screen, the physical security maintenance degree may be lowered. Since a security maintenance degree can be appropriately adjusted depending on the user's intent and body structure as such, it is possible to offer a heuristic usability. Meanwhile, as depicted in FIG. 6B, from a view of an attacker (other people than the user, cameras, and the like), the security channel interface 320 is covered with the user's hand and thus cannot be seen.

Figure 7:
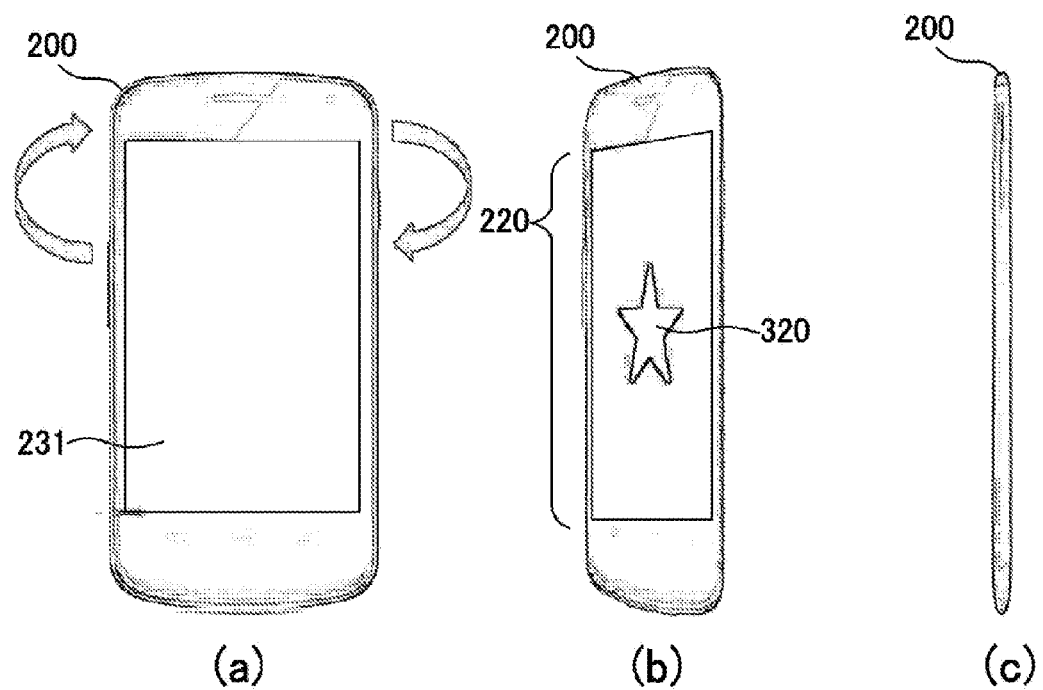
FIG. 7 shows an example for explaining a process for activating a security channel interface by recognition of a first sensor and a second sensor in accordance with another illustrative embodiment.

FIG. 7 shows an example for explaining a process for activating a security channel interface by recognition of a first sensor and a second sensor in accordance with another illustrative embodiment.

As depicted in FIG. 7A, the security channel interface providing device 200 in accordance with another illustrative embodiment may comprise the first sensor 231 that recognizes a touch and the second sensor 232 that senses a direction. The second sensor 232 that senses a direction may be configured using a direction sensor, an acceleration sensor, a gyro sensor, a gravity sensor, and the like. If the security channel interface providing device 200 is tilted while the user letting the first sensor 231 sense, as depicted in FIG. 7B, the security channel interface 320 is output on the display unit 220. both the touch recognition conditions of the first sensor 231 and the tilting degree conditions of the second sensor 232 are met, as depicted in FIG. 7B, the security channel interface 320 is activated and displayed on the display unit 220. The user can confirm a security channel through the activated security channel interface 320 securely and can reset the security channel interface 320 to an inactive state by disabling recognition of at least one of the first sensor 231 and the second sensor 232. Further, after activating the security channel, the user can input a password through a password input interface securely. When the input password is matched with the password of the security channel, security feature may be reset. Furthermore, as depicted in FIG. 7C, since the security channel interface providing device 200 is tilted, the attacker can see only a side surface and a rear surface of the security channel interface providing device 200 but cannot see the security channel interface 320 itself. Depending on a degree of tilting of the security channel interface providing device 200, a physical security maintenance degree can be adjusted. The user can tilt the security channel interface providing device 200 taking an attacker's point of view into account so as to make the attacker only see the rear surface of the security channel interface providing device 200, and adjust the physical security maintenance degree.

Meanwhile, the security channel shown in FIG. 7B is an example displayed as a shape. In addition to the shape, the security channel may display temporary confidential information ancillary to a password using an identifier, for example, numbers, letters, colors, and the like.

Figure 8:
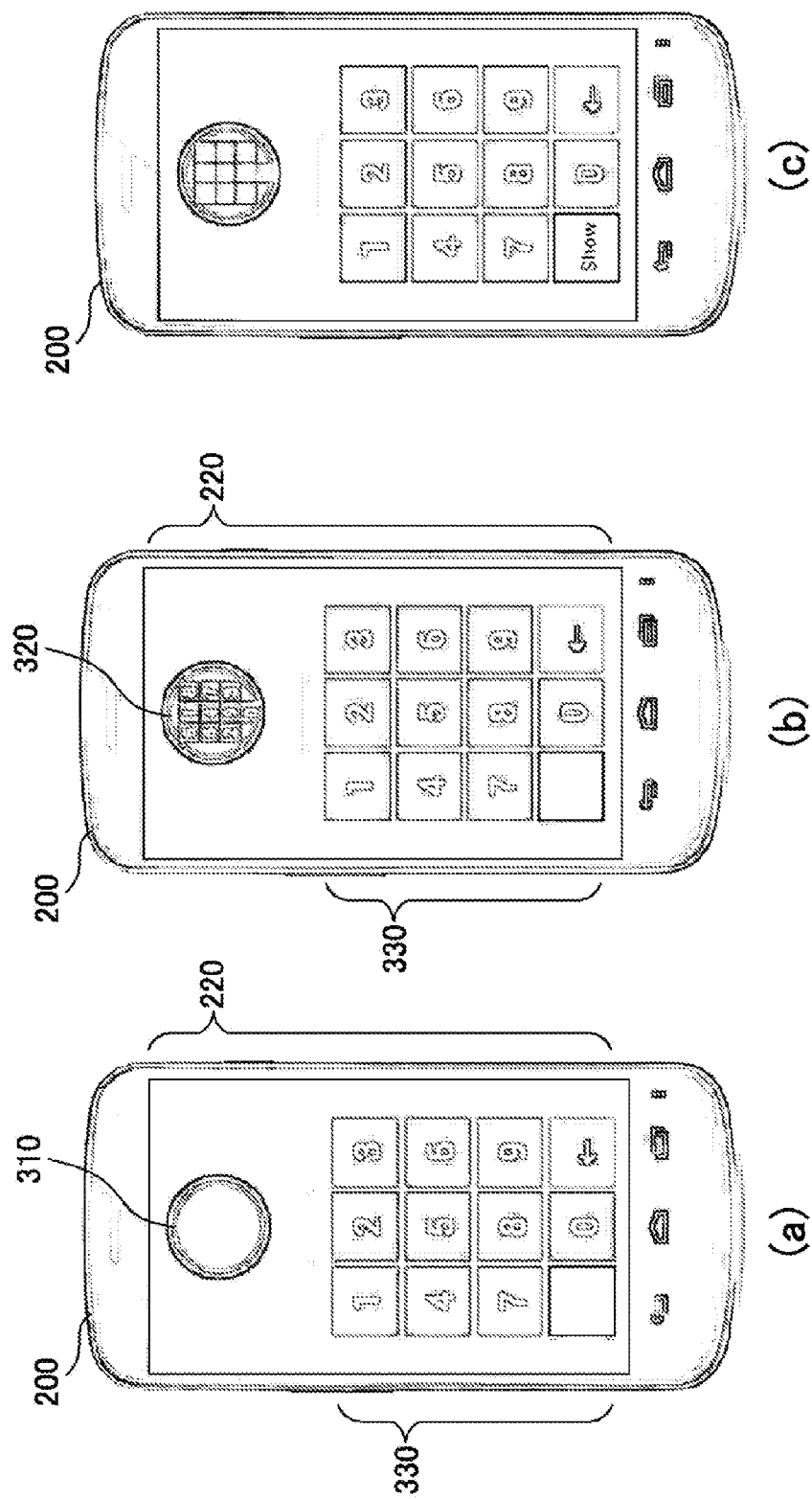
FIG. 8 illustrates a security channel interface and a password input interface in accordance with still another illustrative embodiment.

FIG. 8 illustrates a security channel interface and a password input interface in accordance with still another illustrative embodiment.

As depicted in FIG. 8A, a security channel and a general channel are separately and respectively positioned at an upper end and a lower end of the display unit 220. On the security channel at the upper end, the guide 310 is shown, and on the general channel at the lower end, a password input interface 330 is shown. If security channel interface activation conditions are satisfied as guided by the guide 310, the security channel interface 320 is activated. Then, as depicted in FIG. 8B, the activated security channel interface 320 and the password input interface 330 are output together on the display 220, and, thus, it is possible for the user to confirm and input a password at the same time. The activated security channel interface 320 can be displayed in any color. As depicted in FIG. 8C, the security channel may be formed using certain colors and temporarily displayed on the password input interface 330 to inform the user of the confidential information. By way of example, if the security channel uses a red color, one of the numeric buttons of the password input interface 330 is displayed in red, and the user inputs a password by touching the red button. If the password provided to the user through the activated security channel interface 320 is matched with the password input by the user through the password input interface 330, the security feature may be reset.

Further, if at least one of sensing values recognized by the first sensor 231 and the second sensor 232 after the security channel interface 320 is activated cannot be maintained, the security channel interface 320 can be reset to an inactive state.

Figure 9:
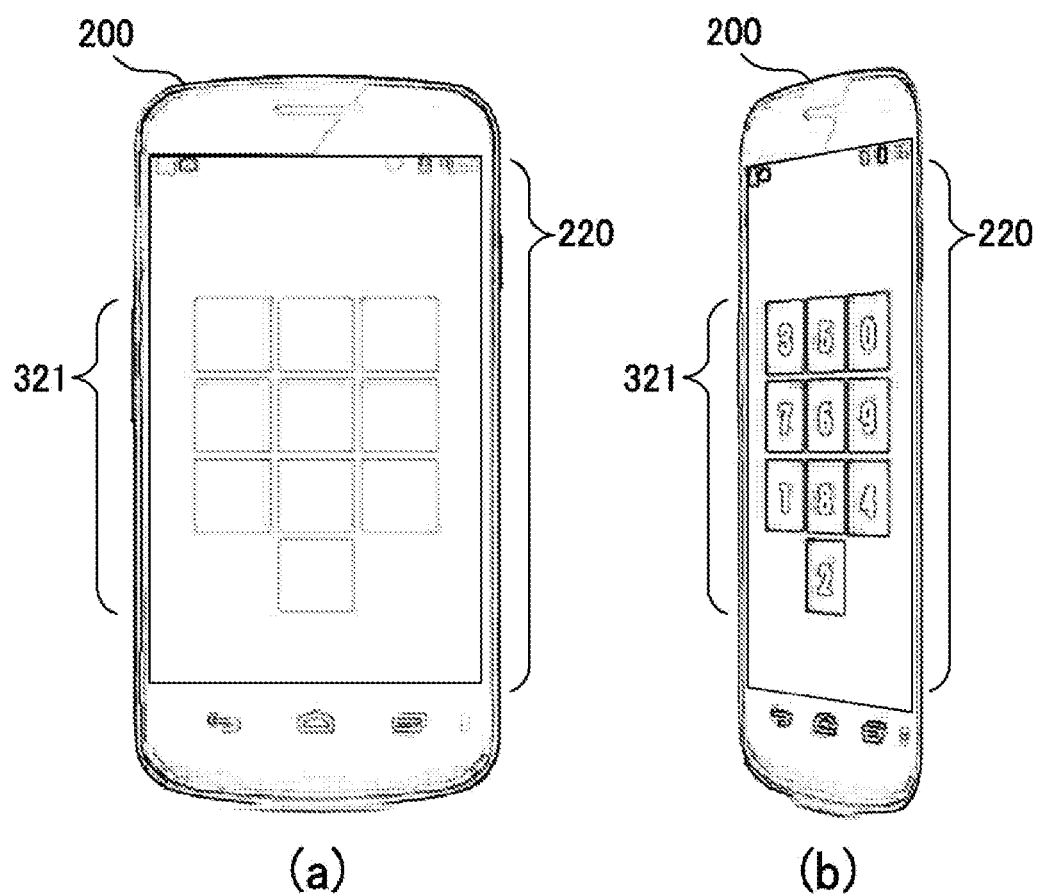
FIG. 9 shows an example of a configuration of a security channel interface combined with a password input interface in accordance with still another illustrative embodiment.

FIG. 9 shows an example of a configuration of a security channel interface combined with a password input interface in accordance with still another illustrative embodiment.

As depicted in FIG. 9A, on a front surface of the display unit 220, an interface 321 as a combination of a security channel interface and a password input interface is shown in an inactive state. as depicted in FIG. 9B, the security channel interface providing device 200 is inclined along with a touch motion and the security channel interface activation conditions are satisfied, the interface 321 as a combination of the security channel interface and the password input interface is activated and displayed on the display unit 220. After checking numbers of the security channel interface, the user may reset the security channel interface to an inactive state and may input a password through the password input interface of a general channel.

Figure 10:
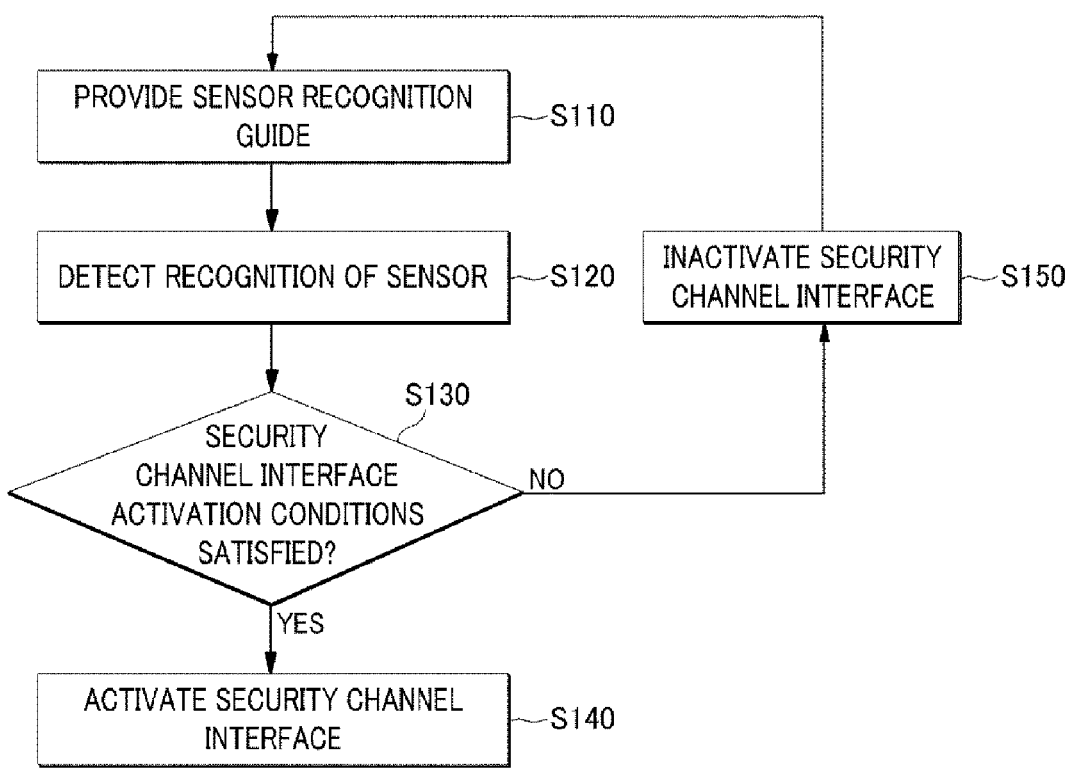
FIG. 10 is a flow chart for explaining a method for providing a security channel interface by a security channel interface providing device in accordance with an illustrative embodiment of the present inventive concept.

FIG. 10 is a flow chart for explaining a method for providing a security channel interface by a security channel interface providing device in accordance with an illustrative embodiment of the present inventive concept.

In step S110, there is provided a sensor recognition guide that guides a user to make a sensor recognize a certain input. That is, in order for the user to take a specific action for making the sensor recognize a certain input, guiding words or a picture may be provided.

In step S120, recognized sensing values are detected. That is, the sensing values input by the user through the action taken along the guide in step S110 are detected.

In step S130, it is determined whether or not the sensing values detected satisfy preset security channel interface activation conditions.

As a result of the determination, in step S140, if at least two sensing values satisfy the security channel interface activation conditions, a security channel interface is activated.

Meanwhile, as a result of the determination, in step S150, if at least two sensing values do not satisfy the security channel interface activation conditions, a security channel interface is maintained in an inactive state (S150) and a sensor recognition guide is still being provided (S110).

Figure 11:
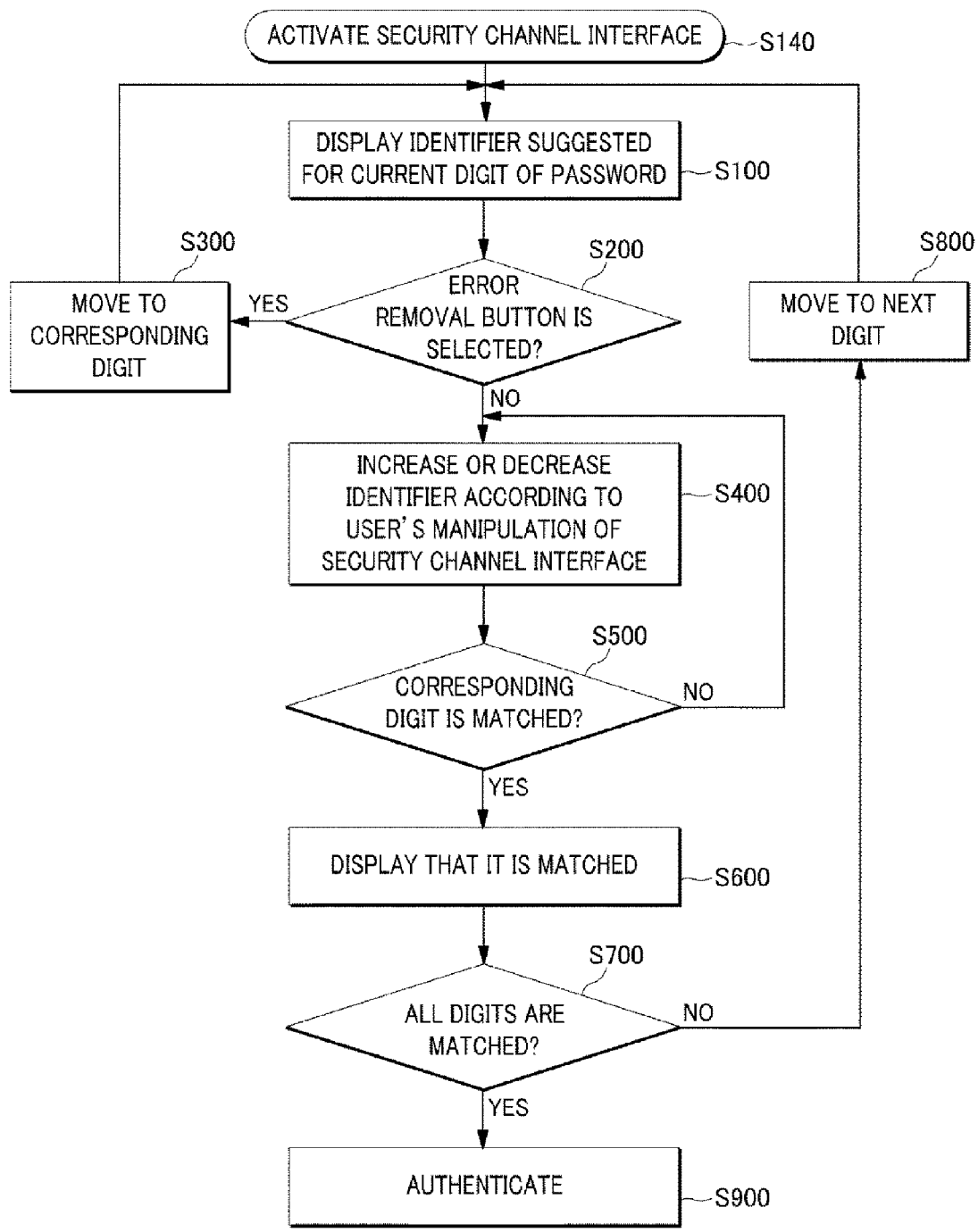
FIG. 11 is a flow chart for explaining a flow of a password input method using a security channel interface providing device when a security channel interface is activated in accordance with an illustrative embodiment of the present inventive concept.

FIG. 11 is a flow chart for explaining a flow of a password input method by using a security channel interface providing device when a security channel interface is activated in accordance with an illustrative embodiment of the present inventive concept.

At the input position of the password, a suggested identifier, i.e. a suggested password value is displayed (S100).

The password may be an OTP as described above, and when a security channel interface is activated, a security channel interface that receives the password input is displayed on the screen.

As can be seen from the illustrative embodiments as shown in the following drawings, the security channel interface provides a slot S that displays at least one identifier constituting the password, a wheel W which can be manipulated by the user to change the identifier, and error removal buttons B (Ex: B1, B2, B3, and B4), the number of which is the same with the number of digits of the password, that lets the user move to the corresponding position of the password.

The security channel interface may be used in various authentication methods to securely deliver confidential information such as numbers, colors, letters, shapes, and the like. Further, specific motion conditions for activating the security channel interface can be set in various ways depending on the device or the interface application such as a motion sensor, and a position of a confidential information delivery interface may vary depending on the configurations of the device.

By way of example, as described in the following illustrative embodiments, a password may be comprised of four digits, which means for the identifiers constituting the password, i.e. password values, four numbers are being used. Therefore, a certain number for each digit is displayed as a suggested identifier at the slot S. However, it can be easily understood by those skilled in the art that the suggested identifiers are not limited to numbers. By way of example, if a password is comprised of alphabetic letters, an alphabet may be displayed as a suggested identifier.

The suggested identifier may be selected randomly, but the present disclosure may not be limited thereto. By way of example, a randomly chosen number may be displayed for the first digit but the same number used for the first digit may be displayed for the second digit in accordance with an illustrative embodiment of the present inventive concept.

The user can select the password value of the slot S by manipulating the security channel interface (S400). By way of example, if the user moves the wheel W in a clockwise direction or a counterclockwise direction, or in an upward direction or a downward direction, the displayed value can be increased or decreased.

If the user determines that the selected identifier value is matched with the value at the corresponding digit (S500), the user moves to another digit and repeats the above steps S100 to S600 until all digits of the password are processed (S700). As described in the illustrative embodiment shown in FIG. 13, the security channel interface providing device 200 may use a sign such as an asterisk (*) to show the user which digits of the password are completely entered, i.e. determined as correct.

If the user determines that all digits of the password are matched, i.e. if the user inputs all digits of the password (S700), a password authentication function is called (S900), the security channel interface providing device 200 determines whether or not the password values input by the user are matched with the actual password values.

If the user selects one of the error removal buttons (S200), the user can move to the corresponding digit (S300). In prior art password input methods, in order to correct a wrongly input digit of the password, the rest digits after the wrongly input digit have to be erased, which provides an opportunity for an attacker to observe the process of inputting the password one more time. However, in accordance with the illustrative embodiments of the present inventive concept, when a digit of the password is wrongly input, only the digit has to be input again. Thus, convenience and security in inputting a password is improved according to one aspect of the present disclosure.

FIGS. 12 to 19 show examples of a security channel interface provided by a security channel interface providing device in accordance with an illustrative embodiment of the present inventive concept.

In these illustrative embodiments, there are illustrated authentication methods in which by increasing or decreasing a number shown by the security channel interface, a password is input. Hereinafter, it is to be noted that a hand motion covering the security channel interface is omitted from the drawings.

As described above, password values provided by the security channel interface are not limited to numbers. By way of example, colors or letters may be used instead of numbers.

Further, the manipulation sensitivity for increasing or decreasing a password value may be changed by the user to be lower or higher than a preset value, and the speed of increasing or decreasing the value can also become lower or higher by a touch motion (scrolling speed).

Figure 12:
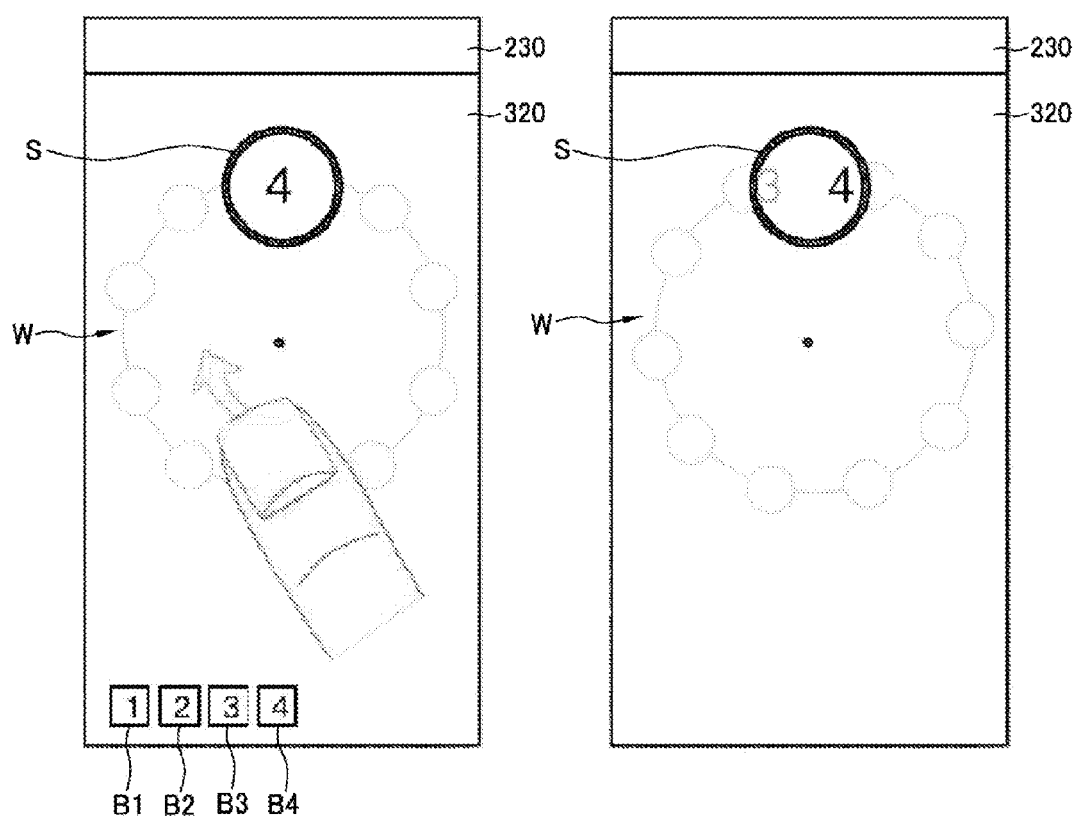
FIGS. 12 to 19 show examples of a security channel interface provided by a security channel interface providing device in accordance with an illustrative embodiment of the present inventive concept.
Figure 16:
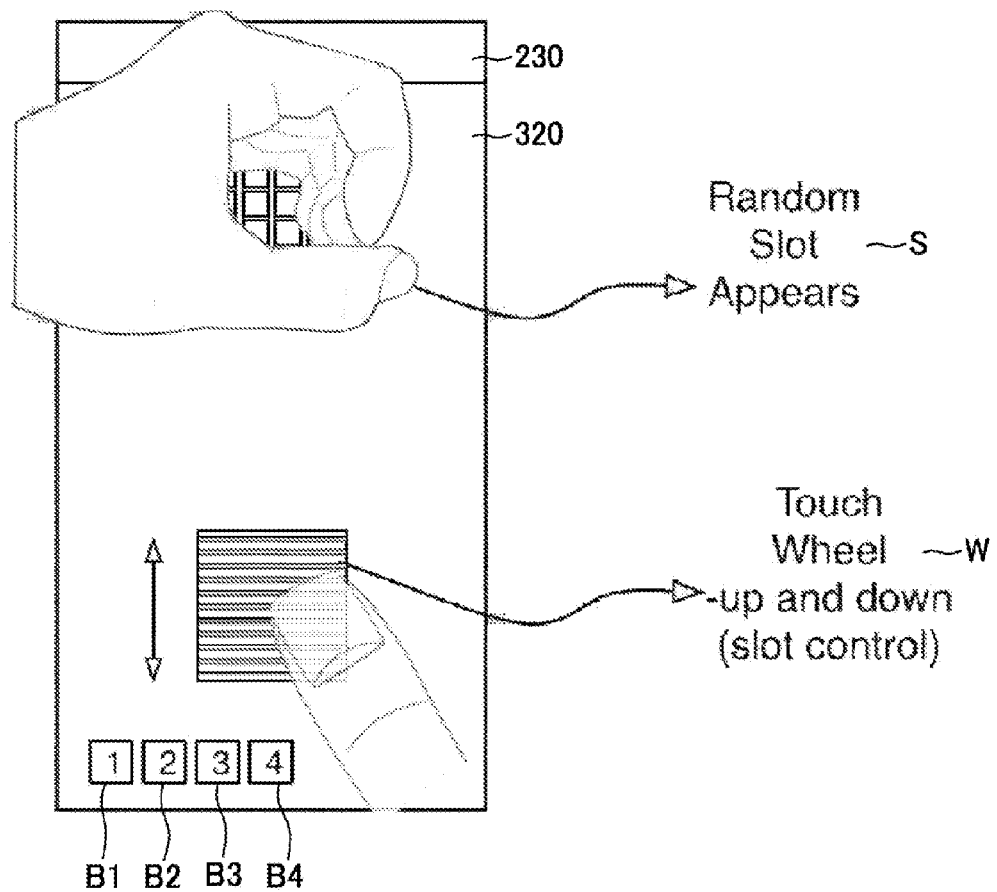

As depicted, the security channel interface providing device 200 in accordance with an illustrative embodiment of the present inventive concept may provide interfaces various in shape and type. By way of example, as depicted in FIG. 12, the wheel W and the slot S may be provided in circular shapes. Or, as depicted in FIG. 16, the wheel W and the slot S may be provided in square shapes.

Further, the interface motion can be configured in various ways. By way of example, the slot S may show one password value or two or more password values. The password value(s) may be increased or decreased on the spot, or may increase or decrease while moving from another position to its position.

Furthermore, the direction of the wheel for increasing or decreasing a password value can be configured in various ways. By way of example, a clockwise direction may be the direction for increasing a password value or a counterclockwise direction may be the direction for increasing a password value. Or, an upward direction may be the direction for increasing a password value or a downward direction may be the direction for increasing a password value.

With various combinations thereof, the security channel interface providing device 200 in accordance with an illustrative embodiment of the present inventive concept can provide various embodiments as described below.

In addition thereto, as described above with reference to FIG. 11, error removal buttons B1 to B4 may be further provided. When a password value is wrongly input, the user can correct only the wrongly entered password value itself, resulting in an improvement in convenience and security.

There have been explained common parts of the illustrative embodiments. Hereinafter, characteristic parts of the respective illustrative embodiments will be explained. Hereinafter, explanation of the common parts may be omitted.

FIG. 12 shows an example where a basic interface is provided in a circular shape. In particular, the wheel W has a dial pad configuration. The slot S displays a single password value and now shows number 4.

The displayed number 4 may be a suggested identifier as explained above with reference to FIG. 11. That is, if the security channel interface provides a number "4" as a password value, the number "4" may be increased or decreased to input a password.

As described above, in the illustrated embodiment, by manipulating the dial pad W in a clockwise direction or a counterclockwise direction, a number in the security channel interface can be increased or decreased. The first diagram of FIG. 12 shows an example where a password value is increased or decreased on the spot, and the second diagram of FIG. 12 shows an example where a password value increases or decreases while moving from another position to its position.

Using such a circular interface, the user can check more visually the process of increasing or decreasing the number in security channel interface based on the angle and amount of the rotation of the dial pad W.

Figure 13:
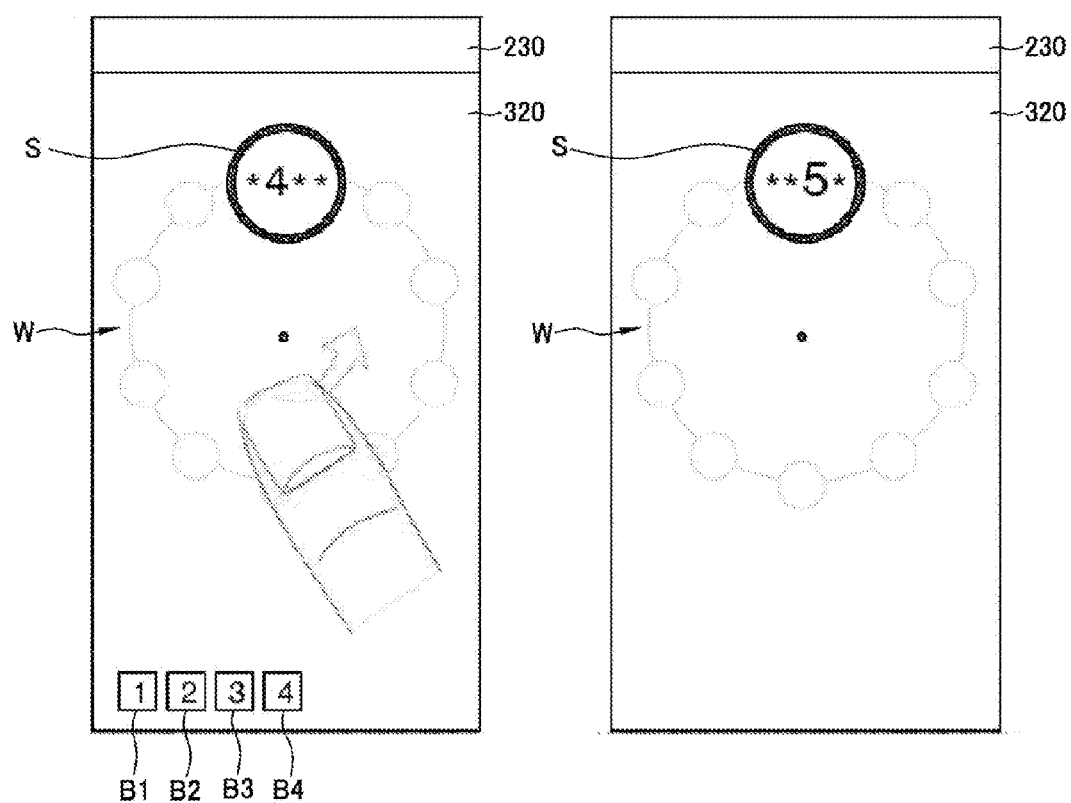

FIG. 13 shows another configuration example of a circular interface and shows a security channel interface that explicitly shows the digit of the password being input. The first diagram of FIG. 13 shows that the second digit of the password is being input, and the second diagram of FIG. 13 shows that the third digit of the password is being input.

The manipulation of increasing or decreasing a number in FIG. 12 and FIG. 13 can be carried out using a dial pad W or a manipulation pad W.

Figure 14:
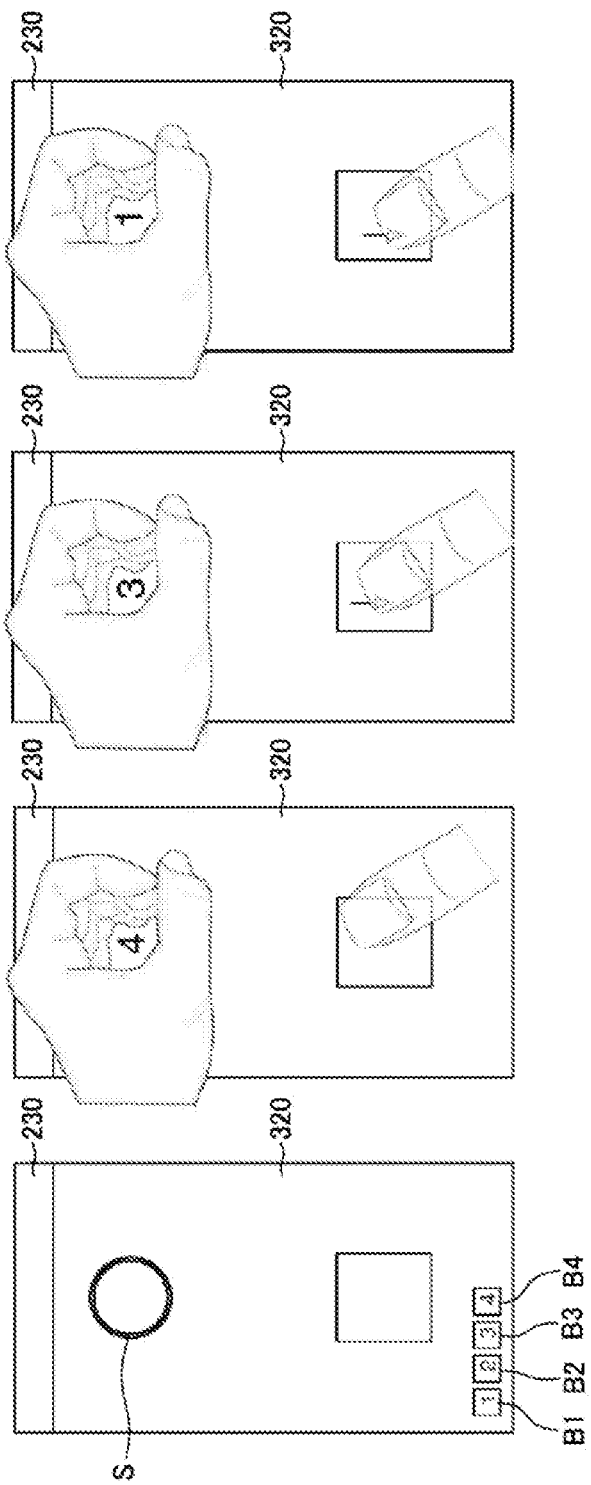

FIG. 14 shows an example where a single password value shown by a security channel interface is being increased or decreased to input the password. In the security channel interface of this example, a single number of the password to be currently input is shown, and the user increases or decreases this number to be matched with the password value in order to input each digit of the password.

FIG. 14 shows that the first number "1" of the password "1234" is being input.

The first diagram of FIG. 14 shows an initial screen, and the second diagram of FIG. 14 shows a screen where the security channel interface is activated. A random number "4" is displayed as a suggested identifier.

The third diagram of FIG. 14 shows that the number "4" is being decreased by using a manipulation pad, i.e. wheel W, at the lower end of the screen. By way of example, if the user drags the wheel W in a downward direction, the number may be decreased, and if the user drags the wheel W in an upward direction, the number may be increased, or vice versa. Or, if the user drags the wheel in a clockwise direction or a counterclockwise direction, to the right or the left, the number may be increased or decreased.

The fourth diagram of FIG. 14 shows that when a number displayed on the slot S is matched with "1" of the first digit of the password, the touch motion is cleared and the password value "1" is being input. Through the above-described process, one digit of the password is input, and then the next digit of the password is input.

The value provided to input the first number of the password is randomly selected. Numbers provided to input the other numbers of the password except the first number (numbers from the second digit) may be randomly selected or may be the same number input just before. In the latter case, for example, if the first number of the password is "1", an initial number in a password value delivery interface for inputting the second number of the password is "1".

Figure 15:
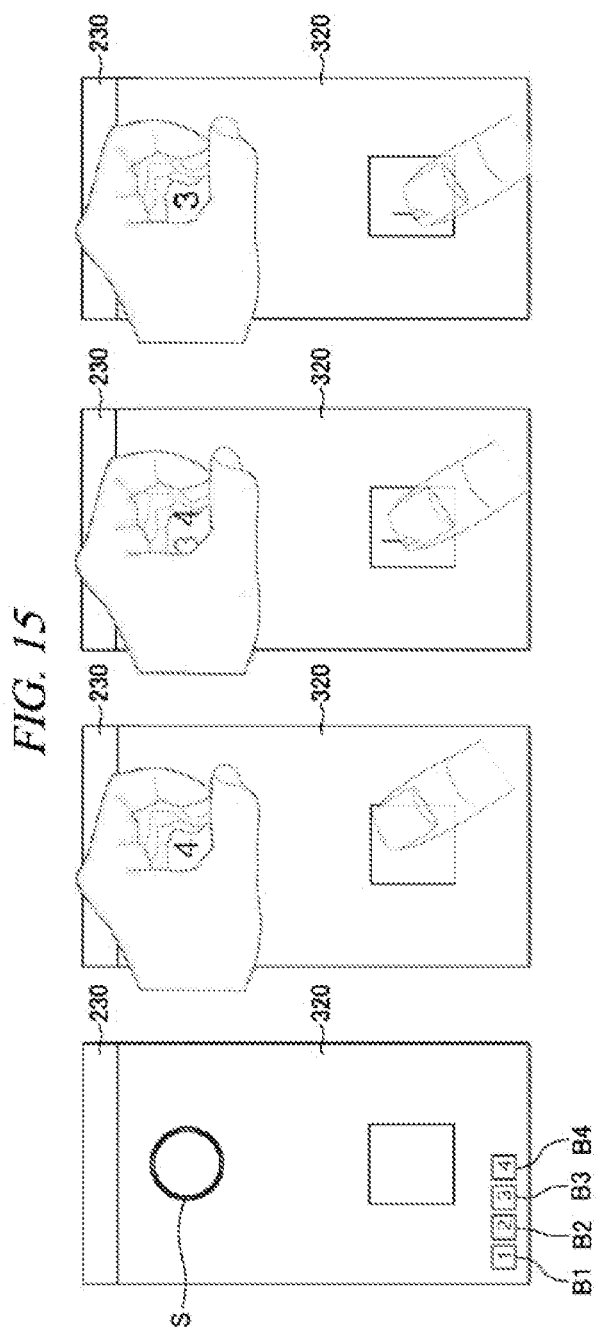

FIG. 15 shows a method in which a password value in a password input interface increases or decreases while moving in a specific direction instead of increasing or decreasing on the spot. Using such a method, the user can check the increasing or decreasing the number more visually, and, thus, it is possible to input a password with more accuracy. FIG. 15 shows that the number is moved from side to side, but the number may be moved up and down.

FIG. 16 shows a configuration example of an interface that displays all of four digits on the security channel interface. Password values for each digit are shown separately by the partitioned slot S, and additionally, numbers before and after the each password value are displayed. In the illustrative embodiment with reference to FIG. 16, if the manipulation pad W is dragged up and down, the password value may be increased or decreased. In this way, the user can see the process of inputting the four digits of the password at a glance. When a password value is input, its corresponding digit is displayed as "*" to show the next digit of the password to be input.

Figure 17:
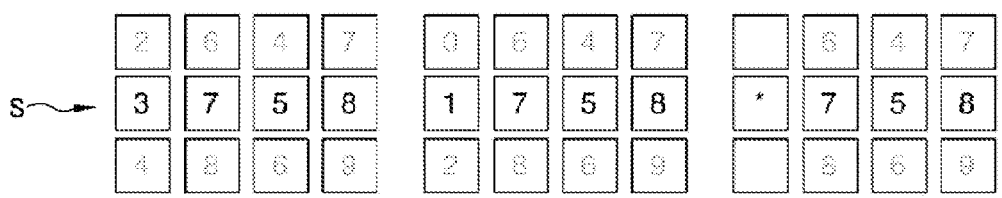
Figure 18:
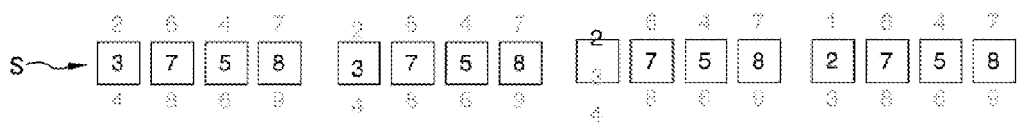

FIGS. 17 and 18 show various illustrative embodiments of the slot of FIG. 16.

Figure 19:

Numbers before and after the password value displayed at the slot may be displayed along with separate cells as depicted in FIG. 17, or may be shown without illustration of the separate cells as depicted in FIG. 18, or both the numbers before and after the password value and the separate cells may be omitted as depicted in FIG. 19.

Further, the password value displayed at the slot may increase or decrease on the spot as depicted in FIG. 17 or while moving as depicted in FIG. 18 and FIG. 19.

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain scope of the present disclosure is defined by the following claims rather than by the detailed description of the embodiment. It shall be understood that all modifications and embodiments conceived from the meaning and scope of the claims and their equivalents are included in the scope of the present disclosure method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A security channel interface providing device comprising:
   a sensor unit that comprises at least two sensors configured to sense a motion of a user; and
   a control unit that determines whether or not at least two sensing values sensed by the sensors satisfy a security channel interface activation condition, and activates or inactivates a security channel interface according to a result of the determination;
   a guide providing unit that provides a guide for inducing a motion of the user; and
   a display unit that displays the guide provided by the guide providing unit and the security channel interface,
   wherein when the security channel interface is activated, the control unit provides a security channel to the user, and
   the guide providing unit displays the guide to guide the user to bring the edge of the user's hand into contact with the display unit along the guide.

2. The security channel interface providing device of claim 1, further comprising:
   a first sensor that detects whether an input means of the user touches the display unit; and
   a second sensor that detects whether the input means of the user comes in a preset distance from an area where the guide is provided,
   wherein the control unit activates the security channel interface when the user touches the display unit and the input means of the user is in proximity to the preset distance from the area provided by the guide providing unit.

3. The security channel interface providing device of claim 2, wherein the guide providing unit displays a circular guide having a preset diameter.

4. The security channel interface providing device of claim 1, further comprising:
   a first sensor that detects whether an input means of the user touches the display unit; and
   a second sensor that detects whether the user tilts the security channel interface providing device, wherein the control unit activates the security channel interface when the user touches the display unit and tilts the security channel interface providing device more than a preset threshold.

5. The security channel interface providing device of claim 1,
wherein the security channel is an one-time password (OTP).

6. The security channel interface providing device of claim 1,
wherein the control unit provides a password input interface, and
when a password provided to the user through the security channel is matched with a password input by the user through the password input interface, a security state set by the password input interface is reset.

7. The security channel interface providing device of claim 1,
wherein when at least one of the sensed sensing values is not maintained after the security channel is activated, the control unit resets the security channel to an inactive state.

8. The security channel interface providing device of claim 1,
wherein the control unit provides a password input interface,
when all digits of a password provided to the user through the security channel and all digits of a password input by the user through the password input interface are matched, a security state set by the password input interface is reset, and
a suggested password value corresponding to a digit of the password to be input is displayed on the security channel, and the displayed password value is increased or decreased by the user's manipulation of the password input interface until the displayed password value is matched with the password value at the digit of the password to be input.

9. The security channel interface providing device of claim 8,
wherein when the user selects one of error removal buttons the number of which is the same with the number of digits of the password, the password value input operation is performed at a digit of the password corresponding to the selected error removal button.

10. The security channel interface providing device of claim 8,
wherein the control unit randomly selects the suggested password value or selects a password value at a digit prior to the digit of the password to be input.

11. The security channel interface providing device of claim 1, when the security channel interface is activated, the security channel interface displays confidential information used for a password.

12. The security channel interface providing device of claim 1,
wherein a physical security maintenance degree of the security channel interface is adjusted depending on the motion of the user.

13. A security channel interface providing method using a security channel interface providing device, the security channel interface providing method comprising:
from at least two sensors provided in a security channel interface, receiving sensing values of a motion of a user generated when a guide for inducing a motion of the user is provided;
determining whether or not the at least two sensing values sensed by the sensors satisfy a security channel interface activation condition;
activating or inactivating the security channel interface according to a result of the determination; and
providing a security channel to the user when the security channel interface is activated, and
displaying a guide and the security channel interface on a display unit, and
wherein the guide is displayed to guide the user to bring the edge of the user's hand into contact with the display unit along the guide.

14. The security channel interface providing method of claim 13,
wherein in the determining whether or not the at least two sensing values sensed by the sensors satisfy a security channel interface activation condition,
based on a sensing value received from a first sensor that detects whether an input means of the user touches the display unit and a sensing value received from a second sensor that detects whether the input means of the user comes in a preset distance from an area where the guide is provided,
when the user touches the display unit and the input means of the user is in proximity to the preset distance from the area provided by the guide providing unit, it is determined that the security channel interface activation condition is satisfied.

15. The security channel interface providing method of claim 14,
wherein the guide includes a circular guide having a preset diameter.

16. The security channel interface providing method of claim 13,
wherein in the determining whether or not the at least two sensing values sensed by the sensors satisfy a security channel interface activation condition,
based on a sensing value received from a first sensor that detects whether an input means of the user touches the display unit and a sensing value received from a second sensor that detects whether the user tilts the security channel interface providing device, when the user touches the display unit and tilts the security channel interface providing device more than a preset threshold, it is determined that the security channel interface activation condition is satisfied.

17. The security channel interface providing method of claim 13,
wherein the providing a security channel to the user comprises:
(a) displaying a suggested password value corresponding to a digit of the password to be input on the security channel interface;
(b) increasing or decreasing the displayed password value by the user's manipulation of the password input interface;
(c) repeating the step (b) until the displayed password value is matched with a password value at the digit of the password to be input; and
(d) repeating the step (a) to step (c) for all digits of the password.

18. The security channel interface providing method of claim 17,
wherein the step (d) further comprises:
when the user selects one of error removal buttons the number of which is the same with the number of digits of the password, performing the step (b) to d) for a digit of the password corresponding to the selected error removal button.

19. The security channel interface providing method of claim 13,
wherein a physical security maintenance degree of the security channel interface is adjusted depending on the motion of the user.

* * * * *